Sept. 9, 1947. H. KERSHAW 2,427,285
INSULATED BRIDGE FOR JUNCTION BOXES
Filed July 31, 1944 3 Sheets-Sheet 1
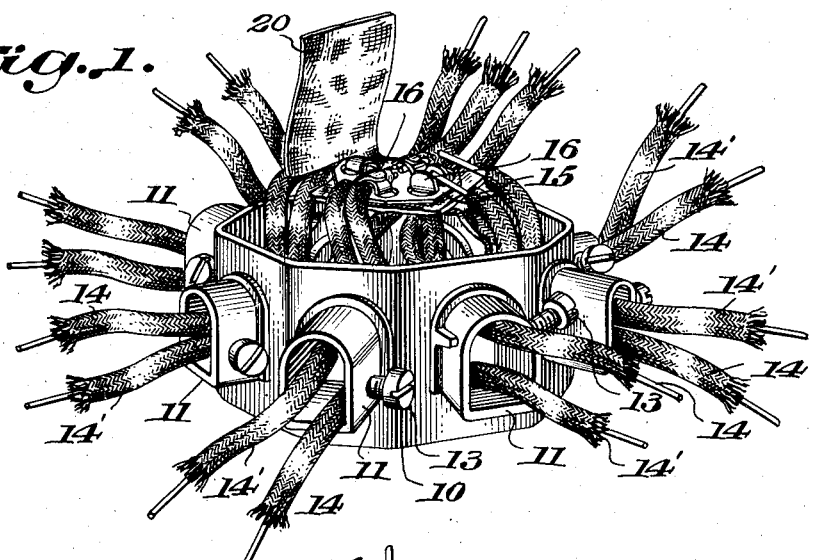
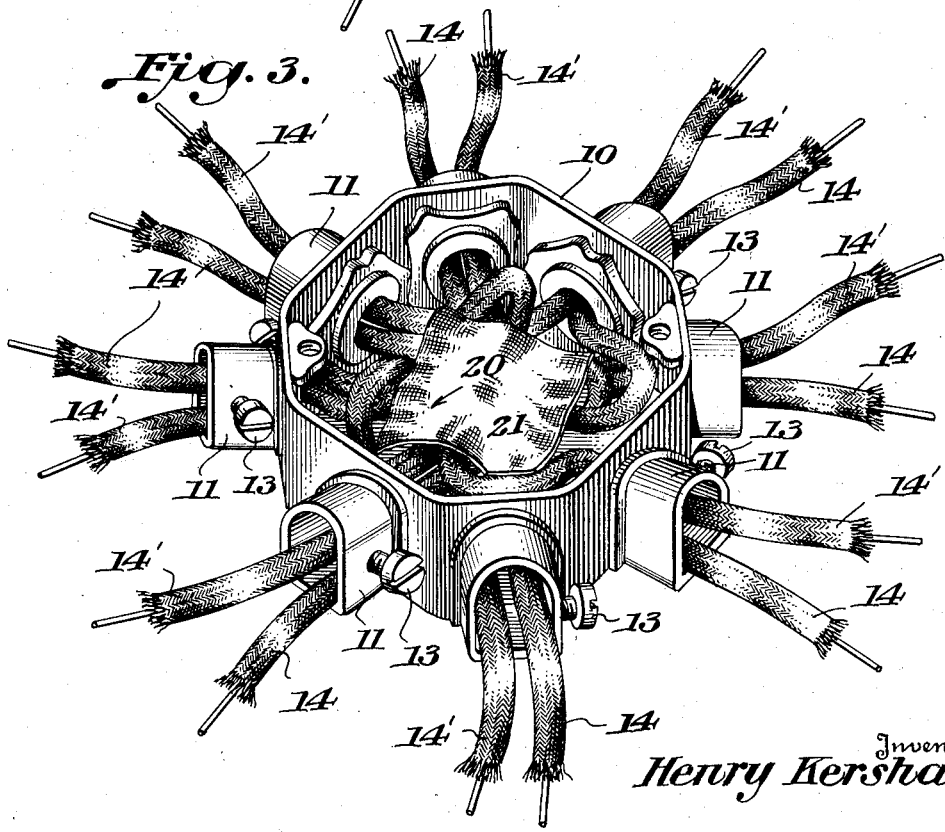
Inventor
Henry Kershaw,

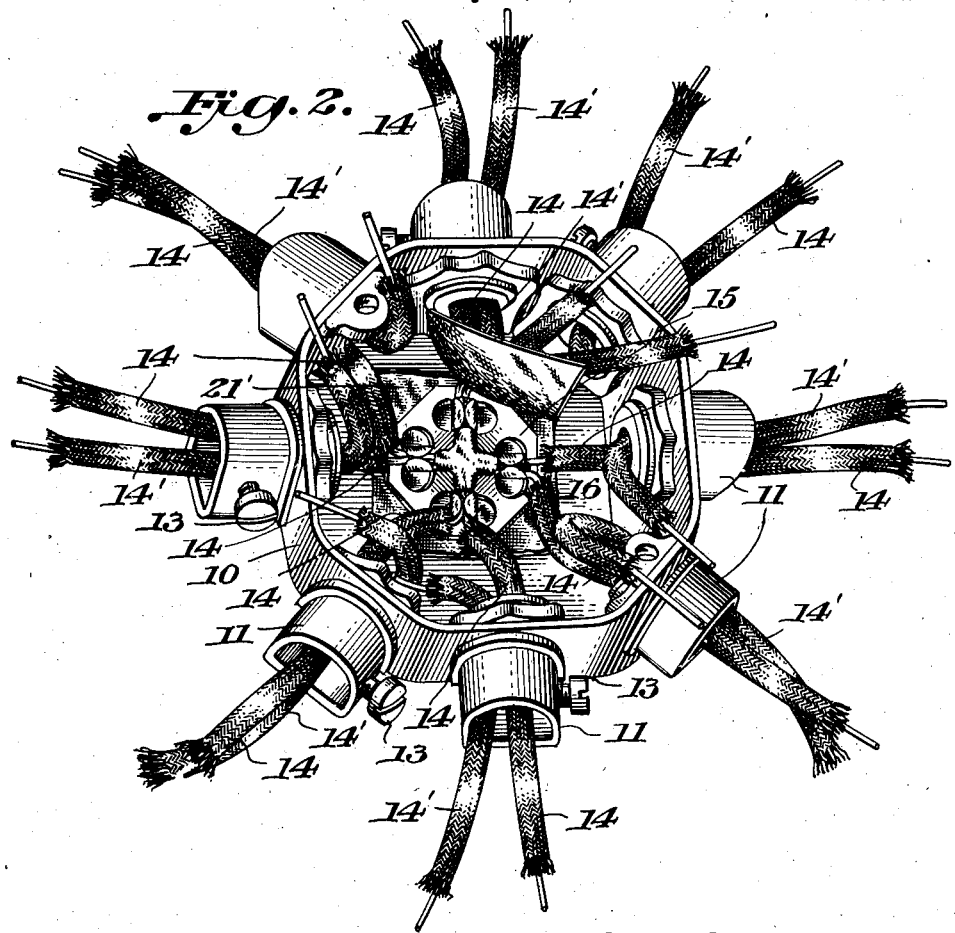
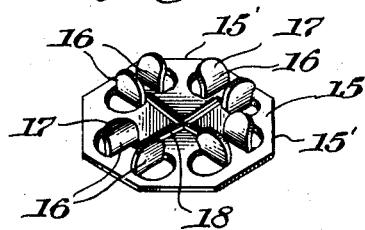
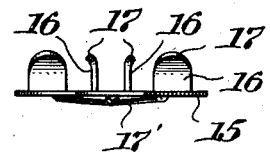
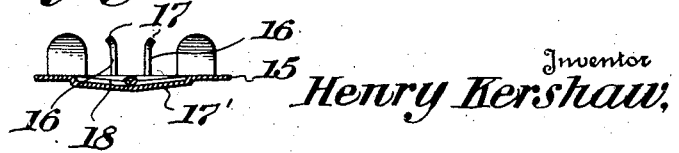

Sept. 9, 1947. H. KERSHAW 2,427,285
INSULATED BRIDGE FOR JUNCTION BOXES
Filed July 31, 1944 3 Sheets-Sheet 3
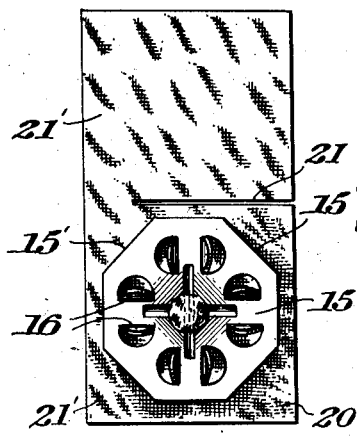
Fig. 6.a
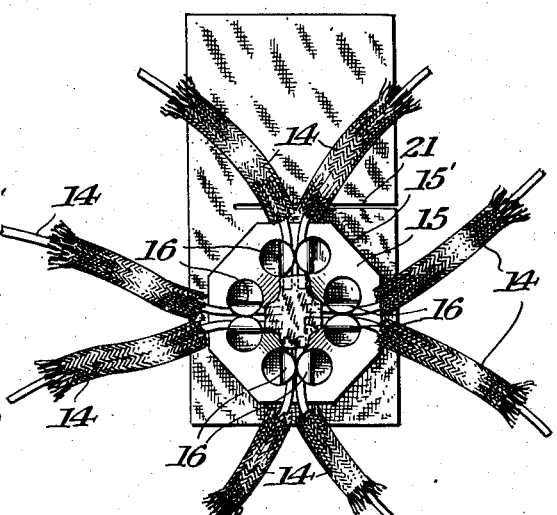
Fig. 7.
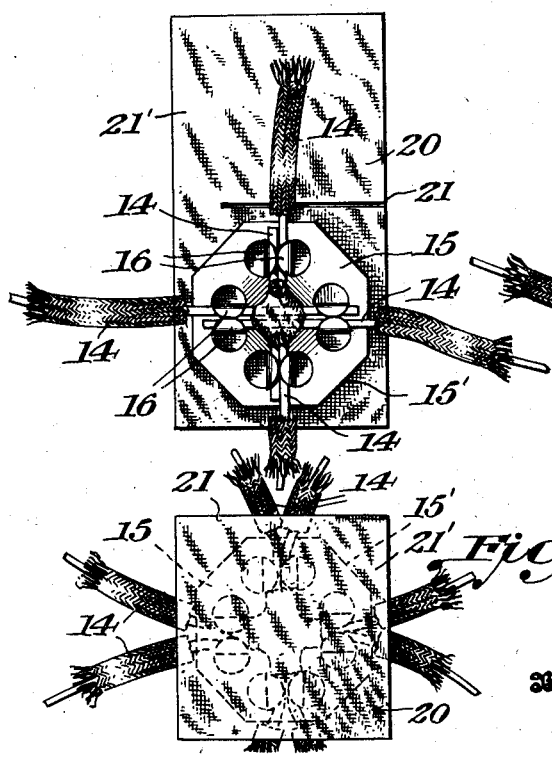
Fig. 8.   Fig. 9.
Fig. 7.a
Inventor
Henry Kershaw,
By
Attorney

Patented Sept. 9, 1947

2,427,285

UNITED STATES PATENT OFFICE 2,427,285

INSULATED BRIDGE FOR JUNCTION BOXES

Henry Kershaw, Belleville, N. J.

Application July 31, 1944, Serial No. 547,346

3 Claims. (Cl. 174—59)

My invention relates to a bridge for use in a junction box.

An important object of the invention is to provide a bridge and insulating means therefor so that the fire hazard is reduced.

A further object of the invention is to provide an insulated bridge for connecting the wires, which will require the minimum space within the junction box, whereby the number of connected wires leading into the junction box may be greatly increased.

A further object of the invention is to provide an insulated bridge which may be conveniently attached to the wires and then turned to bring the bridge and wires in position within the junction box.

A further object of the invention is to provide a bridge of the above mentioned character carrying its solder, to be used in attaching the wires to the bridge.

A further object of the invention is to provide a bridge of the above mentioned character, having a proper current carrying capacity, so that there is no danger of overheating at the connections.

A further object of the invention is to provide the bridge with lugs so shaped that pliers will not readily slip off of the lugs when such pliers are being used to squeeze the lugs around the wires.

A further object of the invention is to provide a bridge of the above mentioned character which is extremely simple in construction and cheap to manufacture.

A further object of the invention is to provide insulating means for the bridge, which insulating means is attached to the bridge when it is placed upon the market.

Other objects and advantages of the invention will be apparent during the course of the following description:

In the accompanying drawings forming a part of this application and in which like numerals are employed to designate like parts throughout the same, Figure 1 is a perspective view of a junction box and insulated bridge embodying my invention, the bridge being connected with the wires and arranged exteriorly of the junction box, Figure 2 is a similar view, showing the insulated bridge turned so that the bridge and wires are moved into the bottom of the junction box, the top section of the insulation strip being raised for the purpose of illustration, Figure 3 is a similar view showing the second bridge connected with the second set of wires and turned and moved into the junction box, with the upper section of the insulation strip in the closed position, Figure 4 is a perspective view of the bridge, Figure 5 is an edge elevation of the same, Figure 6 is a vertical section taken on line 6—6 of Figure 5, Figure 6a is a plan view of the bridge and insulation strip attached thereto, showing the manner in which the product is placed upon the market, Figure 7 is a plan view of the bridge, showing eight wires attached thereto, Figure 8 is a similar view showing four wires attached to the bridge, Figure 9 is a similar view showing two wires attached to the bridge, and Figure 7a is a view similar to Figure 7 with the upper section of the insulation strip folded over the bridge and secured to the lower section of such strip.

In the drawings, wherein for the purpose of illustration is shown a preferred embodiment of my invention, the numeral 10 designates a junction box, having sleeves 11 to receive pairs of wires 14 and 14', which may or may not be enclosed in the usual flexible metal tubing. When the metal tubing is used, such tubing is clamped in the sleeves 11, as is well known. The bottom of the junction box 10 is closed and its front is formed open and is closed by the usual cover, not shown. It will be noted that I have shown the junction box as provided with eight sleeves or inlets 11. The conventional junction box has four of these sleeves. By the use of my insulated bridge I can greatly increase the number of wires connected within the junction box, and hence the number of sleeves 11 may be doubled.

Numeral 15 designates a substantially flat bridge or relatively stationary plate. This substantially flat bridge is shown as polygonal and is formed of sheet copper of suitably lower resistance to properly carry the load without liability of overheating at the connections. This sheet was originally square and its corners were cut off as indicated at 15'. The bridge has pairs of lugs 16 stamped therefrom and these pairs are arranged at 90° apart. The lugs 16 in each pair extend upon one side of the bridge 15 and are disposed at substantially a right angle thereto. The lugs 16 in each pair are spaced and their outer ends are bent outwardly slightly, providing diverging angular portions 17. The central portion 17' of the bridge is slightly depressed or dished and this portion has radial grooves 18 upon its upper face, and these grooves cross, as shown. These grooves receive the molten solder. When the bridge is sold it comes equipped with a dab of plastic solder 19, usually arranged at the center of the dished portion 17'.

The numeral 20 designates a flexible insulation strip or sheet, formed of asbestos or the like and having an adhesive applied thereto, similar to friction tape. This insulation strip or sheet has a transverse slip 21 which divides the strip into sections 21', which are permanently connected. Figure 6a shows the complete insulated bridge. The bridge 15 is arranged upon and secured to the lower section 21' of the insulation strip. Each section 21' extends outwardly beyond the edge of the bridge for a suitable distance. The plastic solder 19 is shown at the center of the bridge.

I will now describe the use of my insulated bridge in connection with eight pairs of wires, and attention is now called to Figures 1, 2, 7, and 7a. There are eight wires 14 which may be positive wires, and eight wires 14' which would be negative wires. All positive wires 14 are connected with one bridge 15 and all negative wires are connected with another bridge 15. The positive wires 14 have their free ends stripped of insulation and these free ends are arranged outwardly of the open front of the junction box, Figure 1. The bridge 15 is now brought to a position near and beneath the free ends of the wires 14. The free ends of the wires 14' would be bent back out of the way. The free end of the wire 14 is now passed between the adjacent pair of lugs 16 and the free end of the next wire 14 is passed between the same pair of lugs 16. As more clearly shown in Figure 7 the free ends of a pair of wires 14 are arranged between each pair of lugs 16. These lugs are now folded or bent inwardly by pliers or the like so that they extend across and have clamping engagement with the pairs of wires 14. The wires 14 extend inwardly beyond the pairs of lugs 16 and are further secured to the bridge 15 by the solder 19 which is heated or melted for that purpose. Some of the molten solder will flow longitudinally within the grooves 18 and pass beneath the wires 14 and thus serve to attach the wires to the bridge 15. After all of the wires 14 are attached to the bridge 15, in pairs, as described, the bridge is turned or twisted and forced downwardly into the bottom of the junction box 10, Figure 2. Prior to this manipulation of the bridge 15, the top insulation section 21' is manipulated to bring the same upon the upper face of the bridge 15, which may be done by virtue of the slit 21. The upper insulation section is now pressed into firm engagement with the upper face of the bridge 15, wires 14, and the lower section 21', the upper and lower sections extending beyond the cut off corners at 15', for considerable distances so that these sections have large areas for adhesive attaching action. In this manner the insulation sections 21' are securely attached to the bridge and to each other, by the adhesive. The bridge, free ends of the wires, and folded insulation strip, constitute a flat unit, which will occupy the least space within the junction box and may be moved to the bottom of the same parallel with such bottom. A second bridge 15 is now secured to all of the negative wires 14' in the same manner, and the insulation strip folded over the same. The second bridge is turned and forced downwardly into the junction box and will be arranged above and parallel with the lower bridge. This is clearly illustrated in Figure 3. It is thus seen that the two bridges are properly insulated from each other and that the two sets of wires are properly insulated. Since the free ends of the wires all extend parallel with the bridge and terminate within the marginal edge of the bridge, these ends are covered so that they cannot cut through the insulation.

In Figure 8 I have illustrated the manner of attaching four wires 14 to the bridge 15. As shown in this figure two of the wires 14 are bent back upon themselves to provide two strands arranged within each pair of lugs 16. The remaining pair of opposed wires 14 extend between the lugs in two pairs, whereby a pair of wires 14 are arranged between the lugs in each pair.

In Figure 9 a pair of wires 14 is connected with the bridge 15. The wires 14 are oppositely arranged and they extend between the lugs in two pairs of oppositely arranged pairs. The insulation strip is used in the same manner, as described.

When the bridges are used in connection with alternating current, two bridges are used with single phase current, and three bridges are used with three phase current.

It is to be understood that the form of my invention herein shown and described is to be taken as a preferred example of the same, and that various changes in the shape, size, and arrangement of parts may be resorted to without departing from the spirit of my invention or the scope of the subjoined claims.

Having thus described my invention, what I claim is:

1. A junction box including a side having openings formed therein for the passage of wires and a closed end and having its opposite end open, a plurality of separate generally flat plates arranged within the box and moveable therein through the open end, the plates being considerably smaller than the box so that their marginal edges are spaced from the side of the box, the plates being free from connection with each other, each plate having pairs of spaced flexible lugs extending for a substantial distance beyond the face of the plate next to the open end and arranged generally at right angles to such face and disposed inwardly of the marginal edge of the plate, the lugs in each pair being adapted to be bent inwardly over a wire arranged between them, the arrangement being such that the pairs of lugs may be engaged by pliers passed through the open end, the plates being individually moveable axially and laterally within the box so that the plates and connected wires may be adjusted within the box for producing a generally flat unit.

2. A connector for wires passed through the sides of a junction box having one end open, said connector comprising a generally flat plate, pairs of spaced flexible lugs formed integral with the plate and being generally equidistantly spaced and extending for a substantial distance beyond one face of the plate and arranged generally at right angles to such face, the pairs of lugs being arranged near and spaced inwardly from the marginal edge of the plate, that portion of the plate inwardly of a pair of lugs being imperforate for receiving solder and having grooves upon its face next to the lugs which lead to the spaces between the lugs.

3. A connector for wires passed through the sides of a junction box having one end open, said connector comprising a generally flat plate, pairs of spaced radial flexible lugs formed integral with the plate and generally equidistantly spaced and extending for a substantial distance beyond one face of the plate and arranged generally at right angles to such face, the pairs of lugs being arranged near and spaced inwardly from the marginal edge of the plate, the lugs in each pair having their outer ends bent outwardly for forming extremities which may be properly engaged by pliers to force the lugs toward each other, that portion of the plate inwardly of the pairs of lugs being imperforate and depressed for receiving solder and the face of the plate next to the pairs of lugs having grooves which communicate with the depressed portion and lead to the spaces between the lugs in each pair, and a sheet of flexible insulating material having a transverse slit extending only partly across the sheet for providing connected sheet sections readily foldable at the slit, the sheet sections having their faces provided with an adhesive, one sheet section being applied to the face of the plate remote from the lugs and the other sheet section being folded over the face of the plate next to the lugs, the slit receiving wire or wires passing to one pair of lugs, the sheet sections extending beyond the marginal edge of the plate so that such sheet sections may be secured together by the adhesive.

HENRY KERSHAW.

REFERENCES CITED

The following references are of record in the file of this patent:

UNITED STATES PATENTS

| Number | Name | Date |
|---|---|---|
| 2,038,210 | Everett | Apr. 21, 1936 |
| 2,072,635 | Helgason et al. | Mar. 2, 1937 |
| 2,006,622 | Allen | July 2, 1935 |
| 2,348,558 | Mesch | May 9, 1944 |
| 1,936,869 | Deaver | Nov. 28, 1933 |
| 1,915,199 | Park | June 20, 1933 |
| 1,225,366 | Schoenman et al. | May 8, 1917 |
| 839,346 | Wardman | Dec. 25, 1906 |

FOREIGN PATENTS

| Number | Country | Date |
|---|---|---|
| 225,398 | Germany | Sept. 7, 1910 |
| 208,432 | Great Britain | Dec. 20, 1923 |